June 10, 1952 H. E. WILLIAMS 2,599,963

TONE ARM MOVING AND LATCHING MECHANISM

Filed March 15, 1951 2 SHEETS—SHEET 1

INVENTOR.
BY Harry E. Williams
Clarence E. Threedy
His Attorney.

June 10, 1952 H. E. WILLIAMS 2,599,963

TONE ARM MOVING AND LATCHING MECHANISM

Filed March 15, 1951 2 SHEETS—SHEET 2

INVENTOR.
Harry E. Williams
BY Clarence E. Threedy
His Attorney.

Patented June 10, 1952

2,599,963

UNITED STATES PATENT OFFICE 2,599,963

TONE ARM MOVING AND LATCHING MECHANISM

Harry E. Williams, Chicago, Ill., assignor to Williams Patent Corporation, Chicago, Ill., a corporation of Illinois Application March 15, 1951, Serial No. 215,666

7 Claims. (Cl. 274—15)

This invention relates to new and useful improvements in a device for moving a tone arm of a phonograph apparatus to non-record-engaging position and for releasably latching said arm in such position. The invention has for its principal object the provision of an improved construction of this character which will be highly efficient in use and economical in manufacture.

An object of the invention is to provide a simplified arrangement for releasably latching a tone arm of an automatic phonograph machine in non-playing position during the selection or stacking of the records. By such an arrangement the tone arm is held from movement into engagement with the record during such selection and stacking or before the selection or stacking operation is completed, thus protecting the records from becoming damaged, broken or scratched by the untimely engagement of the tone arm with the records.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2:
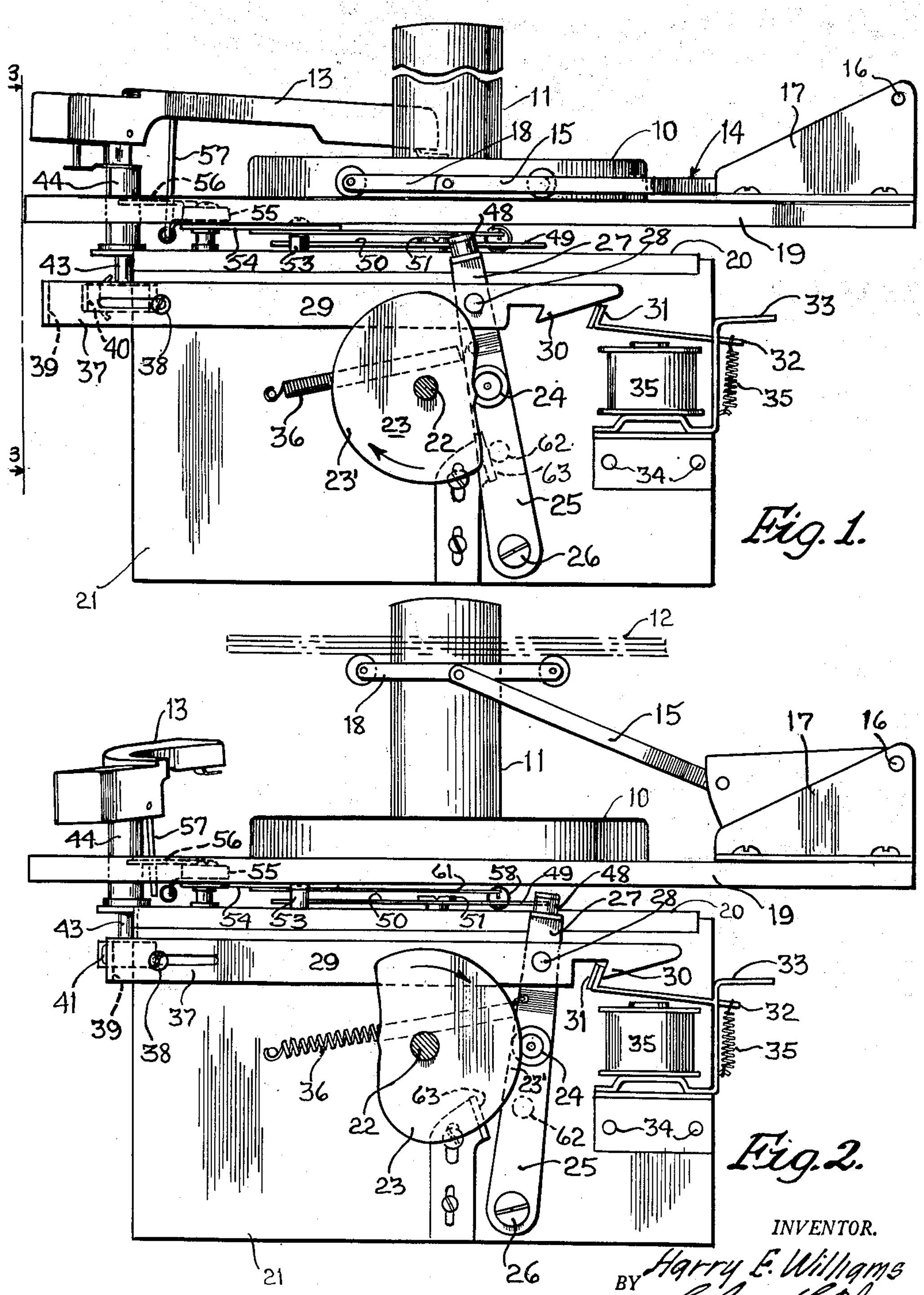
Fig. 1 is a side elevational view of the invention.
Fig. 2 is a side elevational view similar to Fig. 1 but showing the parts thereof in different positions.
Figures 3, 4, 5, 6, 7:
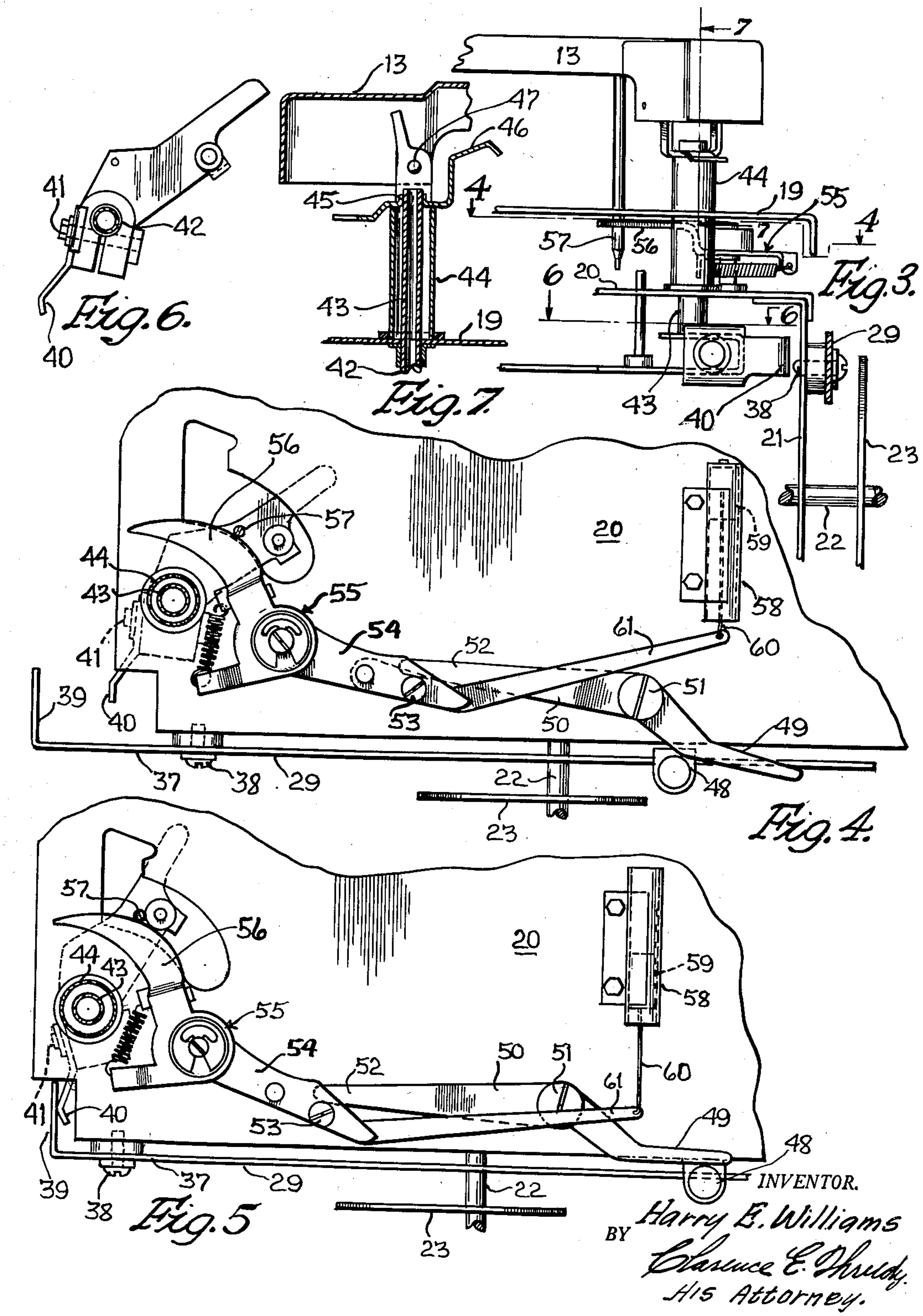
Fig. 3 is an end elevational view taken substantially on line 3—3 of Fig. 1.
Fig. 4 is a sectional detail view taken substantially on line 4—4 of Fig. 3.
Fig. 5 is a sectional detail view similar to Fig. 4 but showing the parts thereof in different positions.
Fig. 6 is a fragmentary sectional detail view taken substantially on line 6—6 of Fig. 3.
Fig. 7 is a fragmentary sectional detail view taken substantially on line 7—7 of Fig. 3.

I preferably associate my invention with an automatic phonograph machine which includes a conventional turntable 10 and a spindle 11 upon which records 12 are adapted to be stacked in a manner well known in the art and separately released for positioning upon the turntable 10. Such apparatus also includes a tone arm 13 which is adapted to oscillate in a horizontal and vertical plane from and to record playing position.

In the phonograph machine illustrated in the drawings, I have shown a record stacking mechanism 14 which is constructed and operates substantially in the same manner as that shown in an application filed on the 10th day of January 1951, Serial No. 205,247, by Edward J. Collins, for patent on a record lifting mechanism. Only so much of such machine is here illustrated as is thought necessary for an understanding of my invention. In this connection a yoke 15 is included in the record lifting mechanism and is pivoted at 16 to fixed brackets 17 for pivotal movement relative to said brackets 17. The outer ends of the yoke 15 provide horizontal bars 18 which engage beneath the lowermost of the records 12 to elevate such records into stacked position upon the spindle.

The turntable 10 is mounted on a supporting structure including a plate 19 arranged above and in spaced relation with respect to a mounting plate 20, the latter having a depending apron 21. A motor-driven shaft 22 is journaled through the plate 21 and carries a cam 23. This cam 23 engages a roller 24 fixed to a lever 25. This lever 25 is pivotally connected at one end as at 26 to the apron 21. The upper end portion 27 of the lever 25 is pivotally connected as at 28 to an elongated latch bar 29 having a latch head 30. This latch head 30 is adapted to have latched engagement with a latch finger 31 provided by an armature 32 pivotally supported by a mounting bracket 33 secured to an apron 21 as at 34. This mounting bracket 33 carries an electromagnetic coil 35 which is adapted to attract the armature 32 to release the latch finger 31 from the latch head 30. Movement of the lever 25 by the cam 23 is resisted by a spring 36.

The end portion 37 of the latch bar 29 is slidably connected by a slot and pin connection 38 to the apron 21. Such end portion 37 is bent to provide a laterally extending finger 39 which is adapted to engage a lug 40 fixedly secured as at 41 to the lower end portion 42 of a shaft 43 extending upwardly through a sleeve 44 carried by the plate 19. The upper end portion of this shaft 43 is fixed as at 45 to the carriage structure 46 which pivotally supports as at 47 the tone arm 13.

The upper end portion 27 of the lever 25 has mounted thereon a roller 48 which is adapted to engage the end portion 49 of a lever 50 pivoted as at 51 to the plate 20. The opposite end portion 52 of this lever engages a stud 53 carried by an arm 54 included as a part of a structure 55 which, through a cam finger 56, acts upon depending pin 57 carried by the tone arm 13, to elevate the tone arm from record engaging position to permit the tone arm to pivot to a non-record-engaging position by action of the latch bar 29.

To cushion the return movement of the tone arm downwardly into record engaging position I provide a dash pump 58 of a well known construction and which includes a piston 59 connected by a wire 60 to an extension 61 secured to the arm 54.

The electromagnetic coil 35 is controlled by a suitable circuit (not shown) which is energized only after the selecting or restacking of the records has been completed and the turntable rotated for play. This circuit has not been shown as it constitutes no part of the present invention.

The lever 25 carries a lateral pin 62 which is adapted to engage an adjustable stop 63 to limit pivotal movement of the lever 25 in an anti-clockwise direction as viewed in Figs. 1 and 2.

The several parts cooperate and function together in the following manner:

Whenever a record selection is made or whenever the stacking operation is effective the cam 23 by the driven shaft 22 will rotate from the position shown in Fig. 1 (which is the normal starting position) to that shown in Fig. 2, in which latter position the hill 23' of the cam 23 engages the roller 24 and moves the latch bar 29 longitudinally with respect to its length to dispose the latch head 30 in latched engagement with the latch finger 31. This movement of the latch bar 29 into such latched position also bears the roller 48 against the end 49 of the lever 50 and causes the tone arm lifting mechanism 55 to bear the finger 56 against the pin 57 whereby to pivot the tone arm upwardly from record engaging position, in which position it is held during its horizontal movement to non-record-engaging postion.

The longitudinal movement of the latch bar 29 to the right as viewed in Figs. 1 and 2 bears the finger 39 against the lug 40. This engagement between the finger 39 and the lug 40 when the latch bar 29 is moved to the right as shown in Fig. 2, will effect pivotal movement of the tone arm horizontally to the position shown in Fig. 2. As the latch head 30 of the bar 29 has latched engagement with the latched finger 31, the tone arm 13 will be held in such position until such time as the coil 35 is energized and the cam 23 is rotated to the position shown in Fig. 1. When the coil 35 is energized the armature thereof will be pivoted to disengage the finger 31 from the latch head 30. Under the action of the spring 36 the latch bar 29 moves to the left as viewed in Fig. 1. This movement of the latch bar 29 releases the tone arm 13 for movement to record engaging position and, at the same time that the tone arm is thus released, the elevating mechanism 55 is actuated to permit the tone arm to move downwardly into record engaging position. The dash pump 58 functions to allow the tone arm to slowly move into record engaging position.

By such an arrangement, clashing between the tone arm and the records is positively prevented during the selection and stacking operation. Until the selection has been completed or until the stacking operation has been effected, the tone arm will be latched against pivotal movement toward record engaging position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, means for releasing said latch means to permit said latch member to move in an opposite direction with respect to its length, means for moving the latch member in said opposite direction, and means actuated by said latch member when the latter is moved in said one direction and having means engaging an element of said tone arm for moving said tone arm in a vertical direction from record engaging position.

2. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, cam means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, means for releasing said latch means to permit said latch member to move in an opposite direction with respect to its length, means for moving the latch member in said opposite direction, and means actuated by said latch member when the latter is moved in said one direction and having means engaging an element of said tone arm for moving said tone arm in a vertical direction from record-engaging position.

3. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, electromagnetic means for releasing said latch means to permit said latch member to move in an opposite direction with respect to its length, means for moving the latch member in said opposite direction, and means actuated by said latch member when the latter is moved in said one direction and having means engaging an element of said tone arm for moving said tone arm in a vertical direction from record-engaging position.

4. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, cam means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, electromagnetic means for releasing said latch means to permit said latch member to move in an opposite direction with respect to its length, means for moving the latch member in said opposite direction, and means actuated by said latch member when the latter is moved in said one direction and having means engaging an element of said tone arm for moving said tone arm in a vertical direction from record-engaging position.

5. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, electromagnetic means for releasing said latch means to permit said latch member to move in an opposite direction with respect to its length, spring means for moving the latch member in said opposite direction, and means actuated by said latch member when the latter is moved in said one direction and having means engaging an element of said tone arm for moving said tone arm in a vertical direction from record-engaging position.

6. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, cam means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, electromagnetic means for releasing said latch means to permit said latch member to move in an opposite direction with respect to its length, spring means for moving the latch member in said opposite direction, and means actuated by said latch member when the latter is moved in said one direction and having means engaging an element of said tone arm for moving said tone arm in a vertical direction from record-engaging position.

7. A device for moving a tone arm of a phonograph apparatus to non-record-engaging position and for releasably latching said tone arm in such position, comprising a supporting structure, means mounting the tone arm on the supporting structure for movement in a vertical and horizontal plane, a latch member slidably carried by said supporting structure for movement in the direction of its length, means for moving said latch member in one direction with respect to its length, means on said latch member for movement therewith into an element of said tone arm to move said tone arm in a horizontal plane from record-engaging position when said latch member is moved in said one direction, means for latching said latch member at the end of its movement in said one direction, said means comprising an electromagnetic coil, an armature for said coil provided with a latch finger for latched engagement with said latch member, spring means for moving the latch member in an opposite direction of its length upon release from said latch finger, and means actuated by movement of the latch member in said one direction of its length and having means engaging an element of said tone arm to move said tone arm in a vertical direction.

HARRY E. WILLIAMS.

REFERENCES CITED

The following references are of record in the file of this patent:

UNITED STATES PATENTS

| Number | Name | Date |
|---|---|---|
| 2,097,288 | Mitchell | Oct. 26, 1937 |
| 2,398,094 | Gay | Mar. 5, 1946 |
| 2,536,432 | Faulkner | Jan. 2, 1951 |